Nov. 21, 1950  A. W. HERRINGTON  2,531,268
POWER UNIT FOR VEHICLES

Filed Dec. 22, 1945  3 Sheets-Sheet 1

INVENTOR.
ARTHUR W. HERRINGTON,
BY
Hood & Hahn
ATTORNEYS.

Nov. 21, 1950  A. W. HERRINGTON  2,531,268
POWER UNIT FOR VEHICLES
Filed Dec. 22, 1945  3 Sheets-Sheet 2
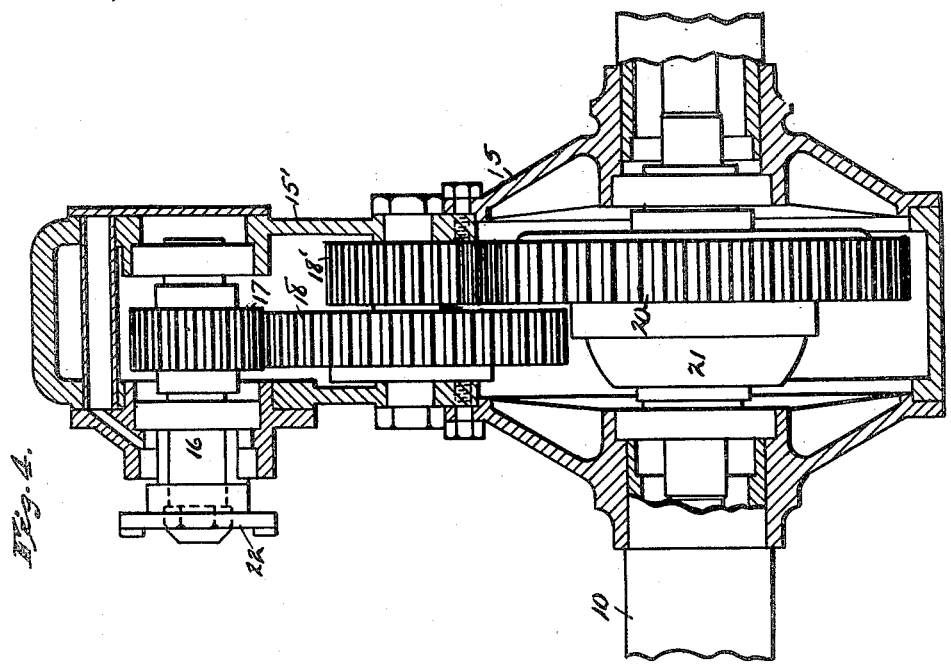
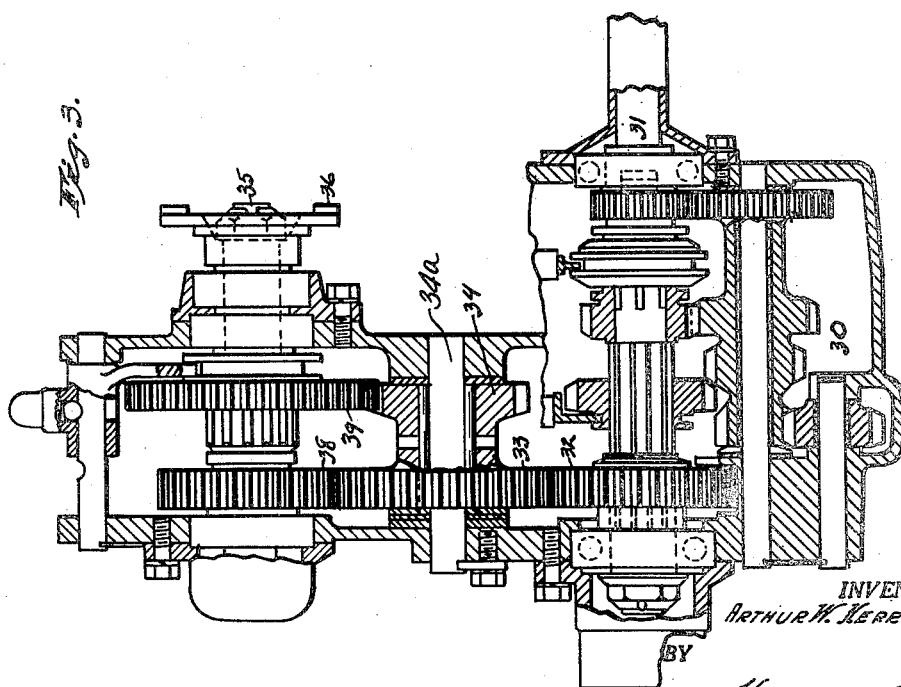
INVENTOR.
ARTHUR W. HERRINGTON,
BY
Hood & Hahn
ATTORNEYS.

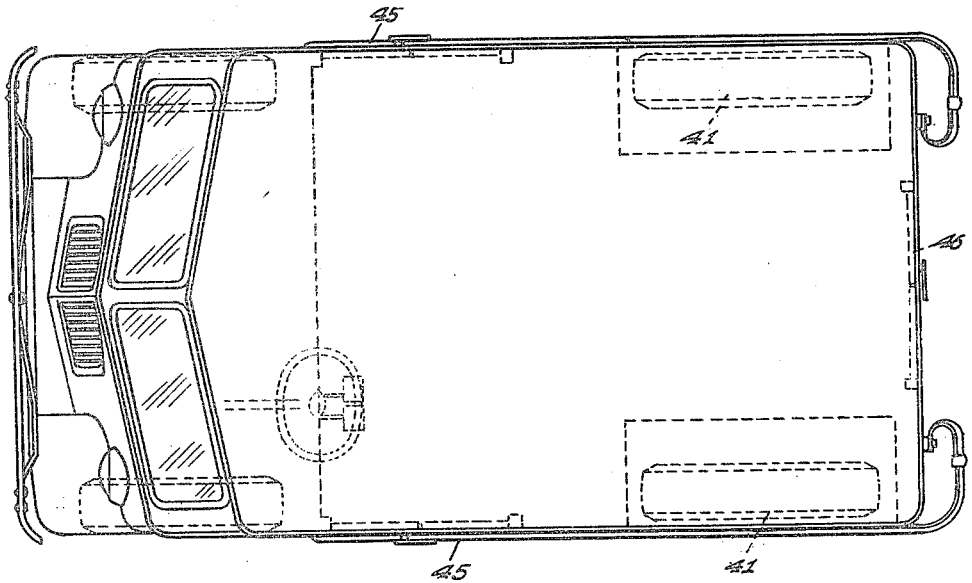
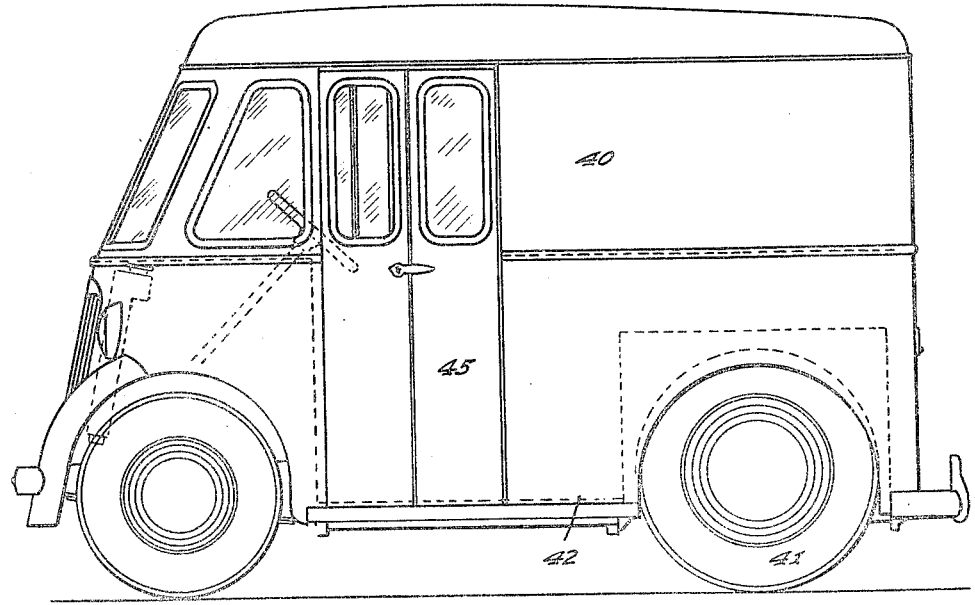

Patented Nov. 21, 1950

2,531,268

UNITED STATES PATENT OFFICE 2,531,268

POWER UNIT FOR VEHICLES

Arthur W. Herrington, Indianapolis, Ind., assignor to Marmon-Herrington Company, Inc., Indianapolis, Ind., a corporation of Indiana Application December 22, 1945, Serial No. 636,913

2 Claims. (Cl. 180—42)

1

This invention relates to power units for automotive vehicles, and particularly to power units which are especially compact. More particularly still, this invention relates to unitary power units for vehicles wherein the prime mover and the drive wheels are integrally associated and closely adjacent.

In many types of vehicles, and particularly in vehicles adapted for deliveries in suburban districts, it is essential that the delivery vehicle be small, convenient for the operator to get in and out, and have a large load carrying capacity.

The particular object of the present invention is to provide a power unit for a vehicle of the type referred to above in which there is substantially greater load carrying capacity than has heretofore been possible.

Still another object is the provision of a highly compact power unit so that a minimum of space is required therefor in a vehicle, leaving the major portion of the vehicle interior available as useful load carrying space.

It is a still further object to provide a power unit for a vehicle adapted for being mounted on the front end thereof thereby eliminating long drive shafts and permitting the load carrying floor of the vehicle to be placed at a substantially lower level.

A still further object is the provision of an integral power unit including a motor and driven wheels which is complete in itself and which may be attached to a suitable load carrying unit.

It is also an object to provide an integral power unit including driven wheels and a drive motor in which the driven wheels are flexibly mounted so that the vehicle can be properly sprung.

These and other objects and advantages will become more apparent upon reference to the following description taken in connection with the accompanying drawings in which:

Fig. 3 is an axial section of the speed change transmission;

Fig. 4 is an axial section of the gearing at the differential;

Fig. 5 is a plan of a stand-up-drive for vehicles and is especially useful; and

Fig. 6 is a side elevation of Fig. 5.

Figure 1:
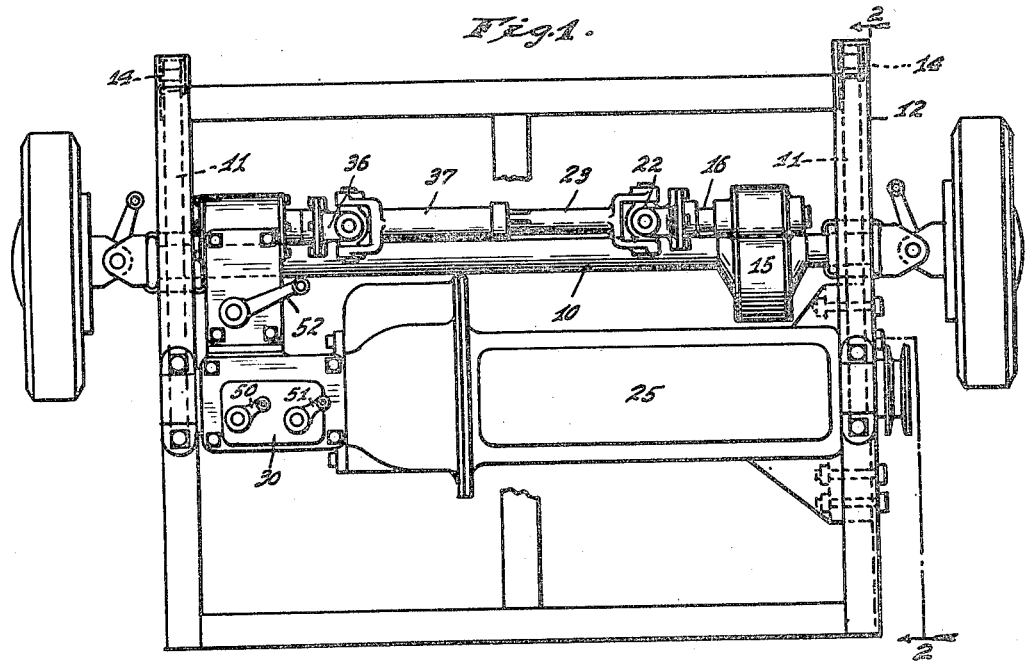
Fig. 1 is a plan, largely diagrammatic, of my improved power unit.
Figure 2:
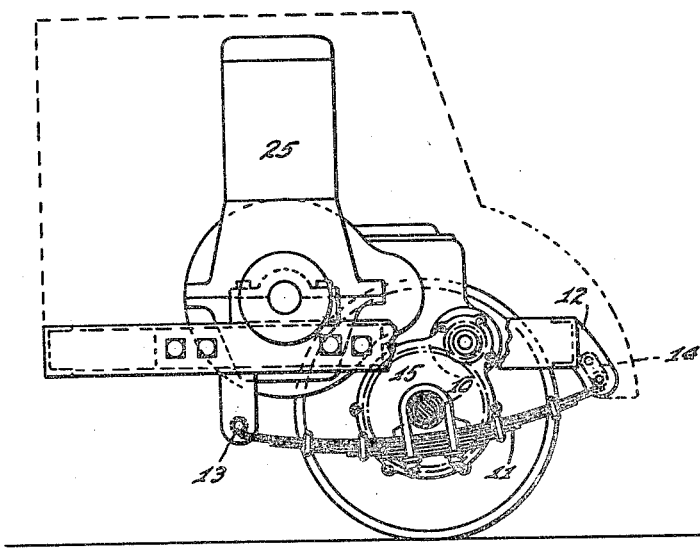
Fig. 2 is a side elevation of Fig. 1.

In the drawings 10 indicates the housing of an axle of the driven steering wheel type carrying near its ends leaf springs 11, 11 of the semi-elliptic type connected to and supporting a body frame 12 by means of a horizontal transverse pivot 13

2 at its rear end and a shackle 14 at its forward end. At an intermediate point in its length, but laterally offset from its middle, is a casing 15 which houses the usual differential gearing which forms part of the live axle assembly, and an input assembly housing 15' in which is journalled input shaft 16 parallel with the live axle and carrying a spur gear 17 which meshes with gear 18 of a reduction train 18—18', with gear 18' meshing with the input gear 20 of the differential gearing 21. Connected to the exposed end of shaft 16, by universal joint 22, is an input shaft 23 which overlies housing 10 approximately parallel therewith.

The motor 25 is supported on frame 12 with its cylinder block alongside differential housing 15 and its crankshaft above and parallel with housing 10. Aligned with the crankshaft of motor 25 is a speed varying transmission 30 comprising an input shaft 31 connected to the engine crankshaft, an output spur gear 32, and conventional intermediate speed change gearing, all on axes parallel with, or aligned with, the engine crankshaft.

Gear 32 meshes with a gear 33 which is clutched to, or integrated with, a gear 34, both gears 33 and 34 being journalled on a counter shaft 34a on an axis laterally offset from the engine crankshaft. Laterally offset from the axis of gears 33 and 34 is an output shaft 35 the axis of which is parallel with the crankshaft and approximately in alignment with shaft 23. Shaft 35 carries a universal joint 36 to which is connected a shaft 37 splined on shaft 23. Journalled on shaft 35 is a gear 38 which meshes with gear 33, and splined on shaft 35 is a gear 39 which may either mesh with gear 34 or serve to clutch gear 38 to shaft 35.

The gearing 33 to 39 affords a two-speed supplement to the conventional speed-change transmission 30 but, primarily, it is to be noted that, by providing either the gear train 32, 33, 34, 39, or 32, 33, 38 and 39, as a clutch, the output shaft 35 and all gearing delivering thereto, lie within the overall length of the conventional speed-change transmission 30 and that the output shaft 35 is thereby laterally offset from the crankshaft and its delivery end directed back toward the input shaft of the driven axle. By this arrangement the overall length of the engine and transmission is kept within such limits that the engine may be set transversely of the chassis frame supported by traction wheels of standard spacing. As a consequent, space occupied by the power plant longitudinally of the vehicle is reduced to a minimum.

It will be noticed that shafts 16 and 35 are at opposite extremes of the width of frame 12 with said shafts approximately aligned when the vehicle is at rest, so that the composite shaft 22, 23, 37, 36 may be of maximum length and flexibility to compensate for the vertical and horizontal vibrations of frame 12 and motor 25 when the vehicle is in motion.

As a consequence of this arrangement, maximum load-carrying and driver space is obtainable by providing a main body 40 supported at its rear end by independently-sprung and non-connected wheels 41, 41 and a floor 42 placed only high enough to afford road clearance and entirely unobstructed immediately to the rear of the power unit so that absolute freedom of movement of the driver is afforded. The main body, at its forward end, projects over and is detachably secured to the body frame 12 of the power unit.

In order to provide a maximum-load-carrying floor area with maximum accessibility to load, the rear wheels lie inside the side walls of body 40. Opposite side doors 45, 45, immediately to the rear of the power unit, and rear doors 46, are, or may be, provided.

Transmission 30 comprises gear controlling levers 50, 51 which are connected by conventional means, not shown, to a suitable gear shift lever in body 40. A lever 52 connected by conventional means to a lever in body 30 serves to shift gear 30.

It will be apparent that while the power unit of the present invention is illustrated in connection with a front wheel drive type vehicle, that the unit could be adapted for a rear wheel drive arrangement if desired and many of the advantages thereof would still obtain.

It will be understood that this invention is susceptible to modification in order to adapt it to different usages and conditions and, accordingly, it is desired to comprehend such modifications within this invention as may fall within the scope of the appended claims.

I claim as my invention:

1. In a power unit for a cargo vehicle having a load carrying platform extended rearwardly from the driver's position; a frame adapted for detachable connection to the front end of the vehicle, a driven-steering-wheel-axle unit comprising an axle housing yieldably supported on said frame and an axle therein to support and drive the steerable front wheels of the vehicle, an input shaft laterally offset from, forwardly of, and parallel to said axle, said input shaft being positioned at one side of said frame and above said axle, gears operatively connecting said input shaft to said axle, an internal combustion engine having a crankshaft rearwardly of and parallel to said axle, an output shaft substantially in alignment with said input shaft and on the opposite side of said frame, a variable speed transmission located at the side of said frame carrying said output shaft and including: gear elements in alignment with said crankshaft, a countershaft interposed between said crankshaft and said output shaft, and gear elements on said countershaft engageable in driving relationship with both of said aforementioned gear elements; and a universal driving connection between said output and input shafts, said engine, transmission, and driving connection all being disposed entirely forwardly of the driver's position of the vehicle.

2. In a power unit for a cargo vehicle having a low cargo platform extending from the driver's position to the rear of the vehicle; a frame adapted for detachable connection to the front of the vehicle, a driven-steering-wheel-axle unit comprising an axle housing yieldably supported on said frame and an axle therein for supporting and driving the steerable front wheels of the vehicle, an input shaft laterally offset and parallel to said axle, said input shaft being positioned at one side of said frame forwardly of and above said axle, gears operatively connecting said input shaft to said axle, an internal combustion engine having a crankshaft rearwardly of and parallel to said axle, an output shaft substantially in alignment with said input shaft and on the opposite side of said frame, a variable speed transmission located at the side of said frame carrying said output shaft and including: gear elements in alignment with said crankshaft one of which is shiftable, other gear elements in alignment with said output shaft and one of which is axially shiftable, a countershaft in the transmission parallel to and between the output shaft and crankshaft, a countershaft gear element on said countershaft meshing with certain of said gear elements in alignment with said crankshaft and output shaft respectively, one of the gears on said countershaft meshing with the shiftable gear in alignment with said output shaft, and a universal drive shaft connecting said output and input shafts, said engine, transmission, and driveshaft all being disposed in their entirety forwardly of the driver's position of the vehicle.

ARTHUR W. HERRINGTON.

REFERENCES CITED

The following references are of record in the file of this patent:

UNITED STATES PATENTS

| Number | Name | Date |
|---|---|---|
| 1,251,749 | Cilley | Jan. 1, 1918 |
| 2,077,130 | Peterson | Apr. 13, 1937 |
| 2,096,541 | Haltenberger | Oct. 19, 1937 |
| 2,232,105 | Fageol | Feb. 18, 1941 |
| 2,357,781 | Randol | Sept. 5, 1944 |

FOREIGN PATENTS

| Number | Country | Date |
|---|---|---|
| 4,512 | Great Britain | A. D. 1906 |
| 362,633 | Great Britain | Dec. 10, 1931 |
| 420,510 | Great Britain | Feb. 28, 1933 |